(12) United States Patent
Krause et al.

(10) Patent No.: US 8,420,261 B2
(45) Date of Patent: Apr. 16, 2013

(54) THIN FILM ALLOY ELECTRODES

(75) Inventors: Larry J. Krause, Stillwater, MN (US);
Lowell D. Jensen, Stillwater, MN (US)

(73) Assignee: 3M Innovative Properties Company,
St. Paul, MN (US)

( * ) Notice: Subject to any disclaimer, the term of this patent is extended or adjusted under 35 U.S.C. 154(b) by 424 days.

(21) Appl. No.: 12/795,740

(22) Filed: Jun. 8, 2010

(65) Prior Publication Data

US 2010/0310937 A1 Dec. 9, 2010

Related U.S. Application Data

(60) Provisional application No. 61/185,399, filed on Jun. 9, 2009.

(51) Int. Cl.
*H01M 4/52* (2010.01)
*H01M 4/58* (2010.01)

(52) U.S. Cl.
USPC .................... 429/223; 429/218.1; 429/231.95

(58) Field of Classification Search ........................ None
See application file for complete search history.

(56) References Cited

U.S. PATENT DOCUMENTS

| | | | |
|---|---|---|---|
| 4,751,086 A | 6/1988 | Jeffrey et al. | |
| 4,950,560 A | 8/1990 | Tarcy | |
| 6,203,944 B1 | 3/2001 | Turner et al. | |
| 6,255,017 B1 | 7/2001 | Turner | |
| 6,436,578 B2 | 8/2002 | Turner et al. | |
| 6,528,208 B1 | 3/2003 | Thackeray et al. | |
| 6,680,145 B2 | 1/2004 | Obrovac et al. | |
| 6,964,828 B2 | 11/2005 | Lu et al. | |
| 7,078,128 B2 | 7/2006 | Lu et al. | |
| 7,160,646 B2 | 1/2007 | Ohshita et al. | |
| 7,498,100 B2 | 3/2009 | Christensen et al. | |
| 2002/0148539 A1 | 10/2002 | Iarochenko et al. | |
| 2003/0211390 A1 | 11/2003 | Dahn et al. | |
| 2005/0031957 A1 | 2/2005 | Christensen et al. | |
| 2006/0046144 A1 | 3/2006 | Obrovac | |
| 2006/0093913 A1 | 5/2006 | Howard et al. | |
| 2006/0093918 A1 | 5/2006 | Howard et al. | |
| 2006/0099506 A1 | 5/2006 | Krause et al. | |
| 2007/0020521 A1 | 1/2007 | Obrovac et al. | |
| 2007/0020522 A1 | 1/2007 | Obrovac et al. | |
| 2007/0020528 A1 | 1/2007 | Obrovac et al. | |
| 2007/0128517 A1 | 6/2007 | Christensen et al. | |
| 2007/0269718 A1 | 11/2007 | Krause et al. | |
| 2008/0003492 A1 | 1/2008 | Bates | |
| 2008/0241665 A1 | 10/2008 | Sano | |
| 2009/0272947 A1* | 11/2009 | Higuchi et al. | ............... 252/514 |

FOREIGN PATENT DOCUMENTS

| | | |
|---|---|---|
| JP | 63004554 | 1/1988 |
| JP | 07024219 B2 | 3/1995 |
| KR | 1020020045614 | 6/2002 |
| WO | WO 01/29920 | 4/2001 |
| WO | WO 2007/044315 | 4/2007 |

OTHER PUBLICATIONS

Wang, "Electrochemical Properties of Nanostructured $Al_{1-x}Cu_x$ Alloys as Anode Materials for Rechargeable Lithium-Ion Batteries", *Journal of the Electrochemical Society*, vol. 155, No. 9, pp. A615-A622, (2008).
International Search Report for PCT/US2010/037393, pp. 5.

* cited by examiner

*Primary Examiner* — Melvin C Mayes
*Assistant Examiner* — Douglas Call
(74) *Attorney, Agent, or Firm* — Steven E. Skolnick (57) ABSTRACT

Thin film alloy electrodes are provided that are useful as negative electrodes in lithium-ion electrochemical cells. The alloys include aluminum and at least one additional electrochemically active metal or composite. They can be used as a current collector or as a complete electrode.

18 Claims, 7 Drawing Sheets

THIN FILM ALLOY ELECTRODES

CROSS REFERENCE TO RELATED APPLICATION

This application claims the benefit of U.S. Provisional Patent Application No. 61/185,399, filed Jun. 9, 2009, the disclosure of which is incorporated by reference herein in its entirety.

FIELD

Thin film alloy electrodes are provided that are useful in lithium-ion electrochemical cells.

BACKGROUND

Lithium-ion electrochemical cells are commonly used to power portable electronic devices such as mobile phones, personal computers, and personal entertainment modules. Lithium-ion cells are currently being developed for use in electric vehicles because they are capable of providing high energy density. Some of the challenges for lithium-ion cell technology are to develop cells that have good thermal stability, cyclability, and can be manufactured at a reasonable cost.

Negative electrodes (anodes) for use in lithium-ion electrochemical cells have been developed that include certain main group metals and alloys such as silicon and tin. Selected main group metals and alloys can reversibly alloy with lithium electrochemically and can provide much higher densities of lithium storage than carbonaceous negative electrode materials, which are typically used as lithium ion negative electrode materials for electronic devices.

Typically, composite electrodes are prepared or formed by dispersing fine powders of these metals or alloys, a conductive diluent, and a polymeric binder in an appropriate solvent such as N-methyl-pyrrolidinone (NMP). The dispersion can then be coated onto a current collector, typically a copper or aluminum metal foil, and then dried at elevated temperature to remove the solvent. Often the resulting composite electrode is compressed mechanically to reduce the pore void volume in the composite and to increase electrical conductivity between the composite and the current collector.

Composites containing silicon or silicon alloys can store large amounts of lithium since silicon is known to reversibly alloy electrochemically with lithium and store in excess of four equivalents of lithium per equivalent of silicon. However, insertion of four equivalents of lithium can also be associated with an approximate volume change of nearly 300%. This dramatic volume change can result in poor reversibility of lithium insertion/de-insertion due to changes in morphology of the composite from expansion and loss of electrical conductivity between the current collector and the composite if the binder cannot accommodate the volumetric changes.

There is a need for electrodes for use in lithium-ion electrochemical cells that have high energy density. There is also a need for electrodes that have high thermal stability and can reversibly store lithium for a large number of charge/discharge cycles. There is also a need for electrodes that are easy to manufacture and relatively low cost.

SUMMARY

In one aspect, a thin film electrode is provided that includes a thin foil that comprises polycrystalline aluminum and at least one additional electrochemically active component. The at least one additional electrochemically active component separates and forms precipitates, grain boundaries, or a combination thereof, within the polycrystalline aluminum, and wherein the foil has a thickness of less than about 500 µm. The at least one additional electrochemically active component can include elements such as indium, silicon, gallium, tin, or a combination thereof. The additional elements in the alloy are not soluble in aluminum at room temperature.

In another aspect, a lithium-ion electrochemical cell is provided that includes a positive electrode and a negative electrode, wherein the negative electrode comprises a thin foil comprising polycrystalline aluminum and at least one additional electrochemically active component, wherein the additional electrochemically active component separates and forms precipitates, grain boundaries, or a combination thereof, within the polycrystalline aluminum, and, wherein the foil has a thickness of less than about 500 µm.

In yet another aspect, a lithium-ion electrochemical cell is provided that includes a positive electrode and a negative electrode, wherein the negative electrode consists essentially of a thin foil comprising polycrystalline aluminum and at least one additional electrochemically active component, wherein the additional electrochemically active component separates and forms precipitates, grain boundaries, or a combination thereof, within the polycrystalline aluminum, and wherein the foil has a thickness of less than about 500 µm.

In this application:

"electrochemically active" refers to materials that can electrochemically react or alloy with lithium;

"lithiate" and "lithiation" refer to a process for adding lithium to an electrode material;

"charge" and "charging" refer to a process for providing electrochemical energy to a cell;

"delithiate" and "delithiation" refer to a process for removing lithium from an electrode material;

"discharge" and "discharging" refer to a process for removing electrochemical energy from a cell, e.g., when using the cell to perform desired work;

"foil" is an essentially two-dimensional alloy in which the third dimension (z-direction) is less than about 500 µm in thickness;

"grain boundaries" refer to regions between adjacent aluminum crystallites (grains) in polycrystalline aluminum in which one or more additional elements, in minor amounts, are dispersed;

"positive electrode" refers to an electrode (often called a cathode) where electrochemical reduction and lithiation occurs during a discharging process; and "negative electrode" refers to an electrode (often called an anode) where electrochemical oxidation and delithiation occurs during a discharging process.

Lithium-ion electrochemical cells that include the provided aluminum alloy film electrodes possess long cycle life, are potentially capable of high energy density, high thermal stability, and can be produced at low cost.

The above summary is not intended to describe each disclosed embodiment of every implementation of the present invention. The brief description of the drawing and the detailed description which follows more particularly exemplify illustrative embodiments.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Thin film electrodes are provided for electrochemical cells. The provided thin film electrodes include polycrystalline aluminum and at least one additional electrochemically active metal. The provided electrodes are in the form of foils that can have a thickness of less than about 500 μm, less than about 200 μm, or even less than about 100 μm. The provided electrodes are useful as negative electrodes in lithium-ion electrochemical cells. They can be used as the only component of the negative electrode of a cell, or can be used as the current collector upon which composite materials can be physically and electrically attached.

Aluminum is an electrochemically active metal which can reversibly react electrochemically with lithium. Pure aluminum can electrochemically react with only 1 equivalent of lithium per equivalent of aluminum. During the reaction, lithium is inserted into the aluminum matrix. The volume change associated with the insertion of 1 equivalent of lithium per aluminum atom results in a volume expansion of about 90%. For comparison, it takes four silicon atoms to electrochemically react with one lithium atom. The volume expansion of lithium inserting into silicon or tin can be around 300%. Furthermore, aluminum is an inexpensive element which can be melted at low temperatures (for example, about 750° C.) and can be readily extruded to form film or foils. A key concern in the use of aluminum is the cycle life of electrochemical cells with pure aluminum as the negative electrode. Pure aluminum (99.99%) has very limited cycle life or reversibility of the electrochemical insertion/de-insertion process thus making pure aluminum unattractive as an electrode in a rechargeable battery.

In the provided thin film electrodes, small amounts of other electrochemically active metals, can dramatically improve the cycle life of aluminum. The addition of these metals into aluminum can have little or no affect on the film-forming properties of aluminum. Therefore the melts or alloys of the present work can be extruded into thin films and foils to be used directly as negative electrodes in lithium-ion electrochemical cells or batteries. The provided thin film aluminum electrodes include at least one additional electrochemically active component (metal or alloy). Useful electrochemically active materials include tin, silicon, antimony, lead, germanium, magnesium, zinc, cadmium, bismuth, indium, silver, gold, and gallium. The amount of electrochemically active component is 20 mole percent (mol %) or less, 10 mol % or less, 5 mol % or less, or even 1 mol % or less of the total alloy (aluminum plus electrochemically active component). The provided thin film electrodes can include at least two electrochemically active components. Exemplary alloys (based upon mol %) include $Al_{99}In_1$, $Al_{98}Si_2$, $Al_{99}Ga_1$, $Al_{98}Si_1In_1$, $Al_{98}Sn_1In_1$, and $Al_{98}Si_1Sn_1$. In the provided electrodes, the at least one electrochemically active component is in a separate phase from the polycrystalline aluminum. The at least one electrochemically active component (or more than one if present), form precipitates, grain boundaries, or a combination at room temperature. Precipitates are separate solid phases, insoluble in aluminum at room temperature, that may range from nanometer size to millimeter size. They are separate particles that do not form a continuous phase.

The provided alloy anode electrodes can be used as current collectors for electrodes used in lithium-ion electrochemical cells. When used as a current collector, composite materials useful for negative electrodes, such as, for example, useful silicon alloys include compositions that include silicon, copper, and silver or silver alloy such as those discussed in U.S. Pat. Publ. No. 2006/0046144 (Obrovac et al.); multiphase, silicon-containing electrodes such as those discussed in U.S. Pat. No. 7,498,100 (Christensen et al.); silicon alloys that contain tin, indium and a lanthanide, actinide element or yttrium such as those described in U.S. Pat. Publ. Nos. 2007/0020521, 2007/0020522, and 2007/0020528 (all to Obrovac et al.); amorphous alloys having a high silicon content such as those discussed in U.S. Pat. Publ. No. 2007/0128517 (Christensen et al.); and other powdered materials used for negative electrodes such as those discussed in U.S. Pat. Publ. No. 2007/0269718 (Krause et al.) and PCT Intl. Publ. No. WO 2007/044315 (Krause et al.) can be employed. Anodes can also be made from thin film electrodes used as current collectors that comprise lithium alloy compositions such as those of the type described in U.S. Pat. Nos. 6,203,944 and 6,436,578 (both to Turner et al.) and in U.S. Pat. No. 6,255,017 (Turner). The negative electrode composite material is generally mixed with a conductive diluent such as graphite and a binder and then coated onto the current collector, heated to remove solvent, and pressed to make the coating more uniform.

With the provided thin film alloy, the use of both a current collector layer and composite as the negative electrode for an electrochemical cell can be avoided. The provided foil or film can be useful in thicknesses that are greater than needed to accommodate the stoichiometry of the electrochemical reaction. The specific capacity of aluminum according to Reaction (I) below is approximately 1000 mAh/g. Lithium according to Reaction (I) is supplied by the positive electrode in the battery. Therefore, if the mass of the aluminum alloy foil or film is greater than what can be lithiated by the limited amount of lithium in the positive electrode, excess aluminum will remain un-reacted in the foil and serve as a mechanical support for the lithiated alloy film.

$$Li + Al \longrightarrow LiAl \qquad (I)$$

Consequently, a further advantage of the provided foils is the ability to use the thin film alloy composites as the complete negative electrode in lithium-ion electrochemical cells—avoiding the need for a current collector, alloy composite, binder, and conductive diluent and thus, reducing cost. Furthermore, since the aluminum film geometric area defines the negative electrode surface area, in contrast to the composite electrode case where the surface area is generally regarded as the Brunauer, Emmett, and Teller (B.E.T.) surface area, much lower chemical reactivity between the charged aluminum electrode and the battery electrolyte can be expected.

The additional (minor) components are not soluble in polycrystalline aluminum at room temperature but can form liquid solutions at appropriate temperatures according to the known phase diagrams. Upon cooling, the minor components separate and form both precipitates and grain boundaries within the polycrystalline aluminum. Without being bound by theory, it is believed that the development of nanocrystalline grains and grain boundaries of the minor electrochemically active components within the aluminum allows for lithium ion transport within and especially across aluminum grains facilitating the increase in cycling performance of polycrystalline aluminum.

The aluminum alloys can be made by heating aluminum above its melting point (for example, to a temperature of about 750° C.) and then adding the at least one additional material. The molten mixture can then be mixed while hot for a period of time and then cooled to room temperature to form an ingot. A foil can then be made by passing the ingot through a rolling mill.

To test the aluminum alloy foils as negative electrodes, the foils were cut into disks and assembled in 2325 coin cells using a positive electrode having using a $Li(Mn_{1/3}Co_{1/3}Ni_{1/3})O_2$ composite and a separator using a procedure described in the Example section below and also similar to that disclosed in U.S. Pat. Nos. 6,964,828 and 7,078,128 (Dahn et al.). All of the tests were done and compared to an identical cell that had a pure aluminum anode. Details are discussed in the Example section below.

Also provided are lithium-ion electrochemical cells that include a positive electrode and a provided negative electrode that includes a thin foil comprising aluminum and at least one additional electrochemically active component as described above. Exemplary positive electrodes contain lithium atoms intercalated within a lithium transition metal oxide such as lithium cobalt dioxide, lithium nickel dioxide, and lithium manganese dioxide. Other exemplary cathodes are disclosed in U.S. Pat. No. 6,680,145 (Obrovac et al) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers. Suitable lithium-containing grains can be selected from lithium oxides, lithium sulfides, lithium halides (e.g., chlorides, bromides, iodides, or fluorides), or combinations thereof. In other lithium ion electrochemical cells with liquid electrolytes, the cathode can include $LiCoO_2$, $LiCo_{0.2}Ni_{0.8}O_2$, $LiMn_2O_4$, $LiFePO_4$, $LiNiO_2$, or lithium mixed metal oxides of manganese, nickel, and cobalt in any proportion. The positive electrodes can be lithium mixed metal oxides that can comprise manganese, nickel, cobalt, or combinations thereof. Electrochemical cells containing one of these positive electrodes and a provided alloy anode can maintain a specific capacity of the positive electrode of greater than about 130 mAh/g, greater than about 75 mAh/g, or greater than about 50 mAh/g, over at least 50 charge/discharge cycles.

Objects and advantages of this invention are further illustrated by the following examples, but the particular materials and amounts thereof recited in these examples, as well as other conditions and details, should not be construed to unduly limit this invention.

EXAMPLES

The preparation of the alloy melts and the battery performance are described below.

Example 1

$Al_{99}In_1$ Foil Electrode 20 g (0.74 moles) of 99.99% pure aluminum shot (Alfa Aesar) was placed into a 50 ml ceramic crucible and placed in a furnace at 750° C. After approximately 20 minutes 0.86 g (0.0075 moles) of 99.99% pure indium was added to the molten aluminum at 750° C. The crucible and its contents were kept at 750° C. for an additional 20 minutes with periodic shaking to stir the molten metals. After a total of 40 minutes the contents of the crucible were poured into a dish-shaped copper mold and allowed to cool to room temperature. Next a small piece of the solidified melt was cut from the ingot and rolled into a foil by a mechanical, hand operated rolling mill. The final thickness of the foil was between 50 μm and 100 μm.

2325 coin cells were constructed to test the performance of the alloy foil as an electrode in a battery. The negative electrode was a 2 cm$^2$ circular disk of $Al_{99}In_1$ cut from the foil. On top of this electrode was place a 25 μm thick porous polyolefin separator (CELGARD 2400, available from Celgard, Charlotte, N.C.) and on top of the separator was placed a positive composite electrode. The positive composite electrode was composed of 90 weight percent (wt %) $Li(Mn_{1/3}Co_{1/3}Ni_{1/3})O_2$ (available from 3M Co., St. Paul, Minn.), 5 wt % carbon black and 5 wt % polyvinylidene fluoride (PVDF, available from Aldrich Chemical) coated onto an aluminum foil current collector. The coin cell was filled with 60 μL of electrolyte composed of ethylene carbonate and diethyl carbonate in a 1:2 weight ratio and containing 1 M $LiPF_6$. The coin cells were then sealed and ready for testing. Cells were cycled between a charge limit of 4.0 V and a discharge limit of 2.5 V. The current density was 300 μA/cm$^2$ based upon the surface area of the aluminum electrode.

Figure 1:
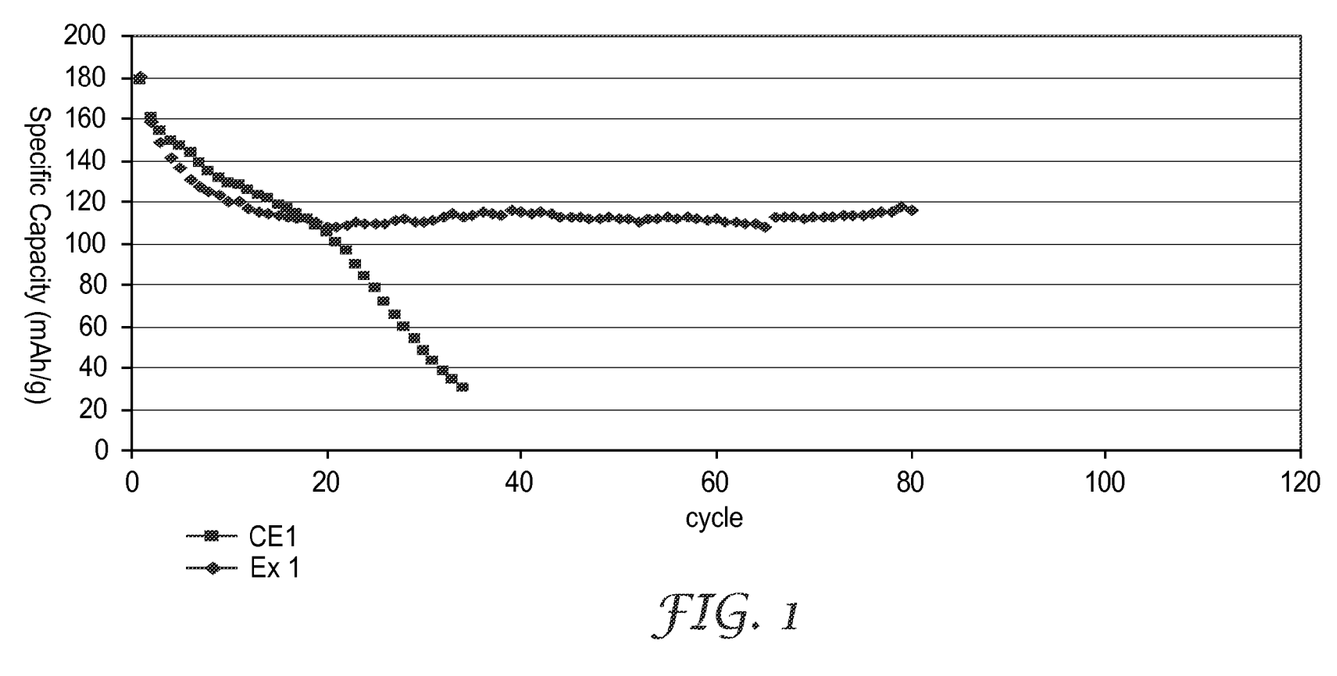
FIG. 1 is a graph comparing the specific capacity (mAh/g) of the positive electrode vs. cycle of a 2325 coin cell containing an $Al_{99}In_1$ negative electrode and that of a comparative negative electrode.
Figure 2:
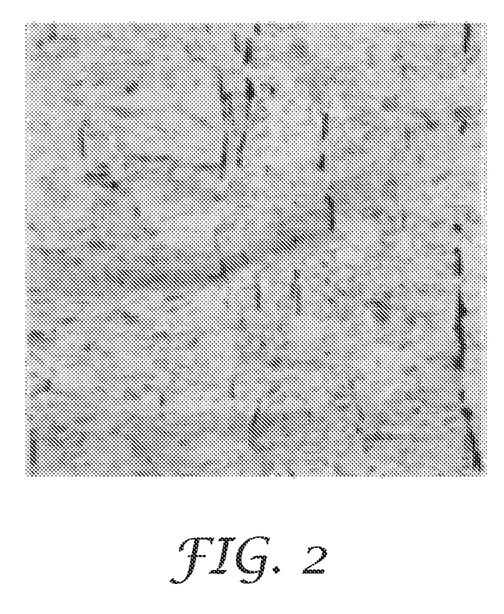
FIG. 2 is a bright field transmission electron microscope image of the $Al_{99}In_1$ negative electrode of FIG. 1.

FIG. 1 shows the cycling performance of coin cells constructed from $Al_{99}In_1$ as the negative electrode (Ex 1) and, as a comparative example, 99.99% aluminum as the negative electrode (CE1). FIG. 1 clearly shows a dramatic improvement of cycle life when $Al_{99}In_1$ is used as a negative electrode compared to pure aluminum. FIG. 2 is a transmission electron microscope of a section of the $Al_{99}In_1$ foil of Example 1.

Small islands (precipitates) of indium (dark areas) can be observed dispersed in the aluminum matrix.

Example 2

$Al_{98}Si_2$ Foil Electrode

Figure 3:
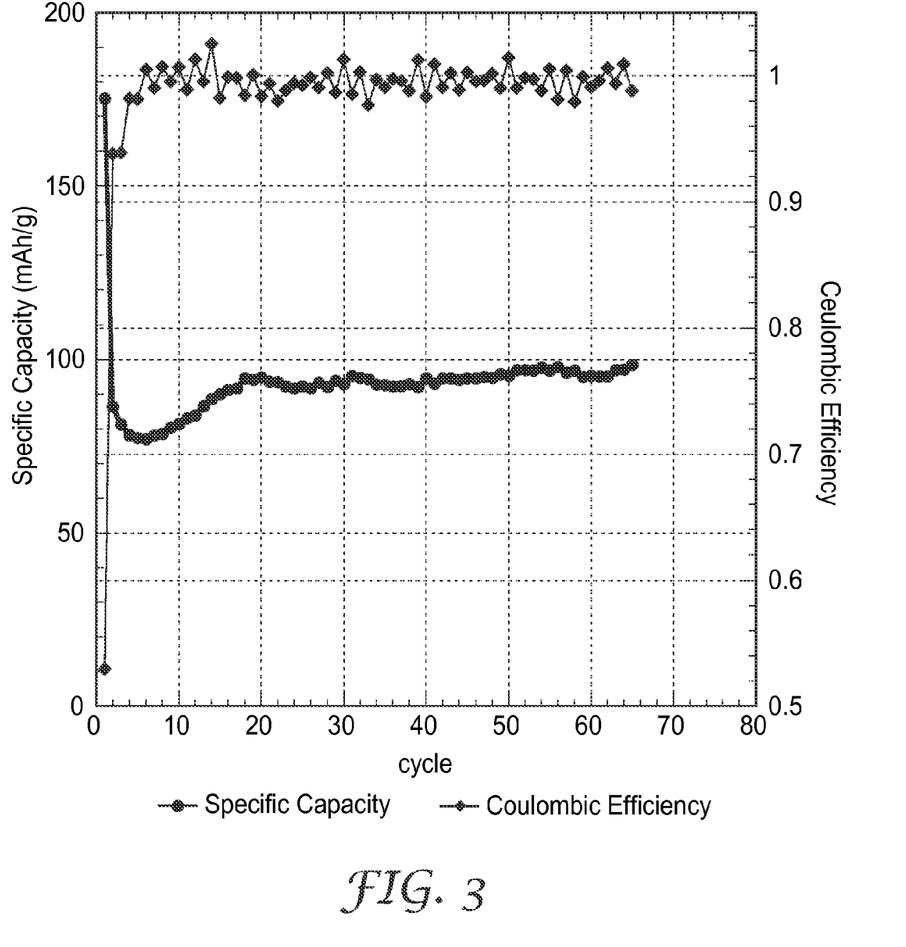
FIG. 3 is a graph of the specific capacity (mAh/g) of the positive electrode vs. cycle of a 2325 coin cell containing an $Al_{98}Si_2$ negative electrode and that of a comparative negative electrode.

Using the procedure described in Example 1 above, 20 g of aluminum was melted in a furnace at 750° C. After 20 minutes 0.42 g of 99.9% silicon (0.015 moles) was added to the molten aluminum. After a total of 40 minutes the molten metals were poured into a copper dish and allowed to cool. A foil was rolled from the ingot and 2325 coin cells constructed to test the performance of $Al_{98}Si_2$ as a negative electrode in a lithium ion battery. FIG. 3 shows the cycle performance of a cell containing the $Al_{98}Si_2$ negative electrode and using a positive electrode identical to that used in Example 1.

Example 3

Figure 4:
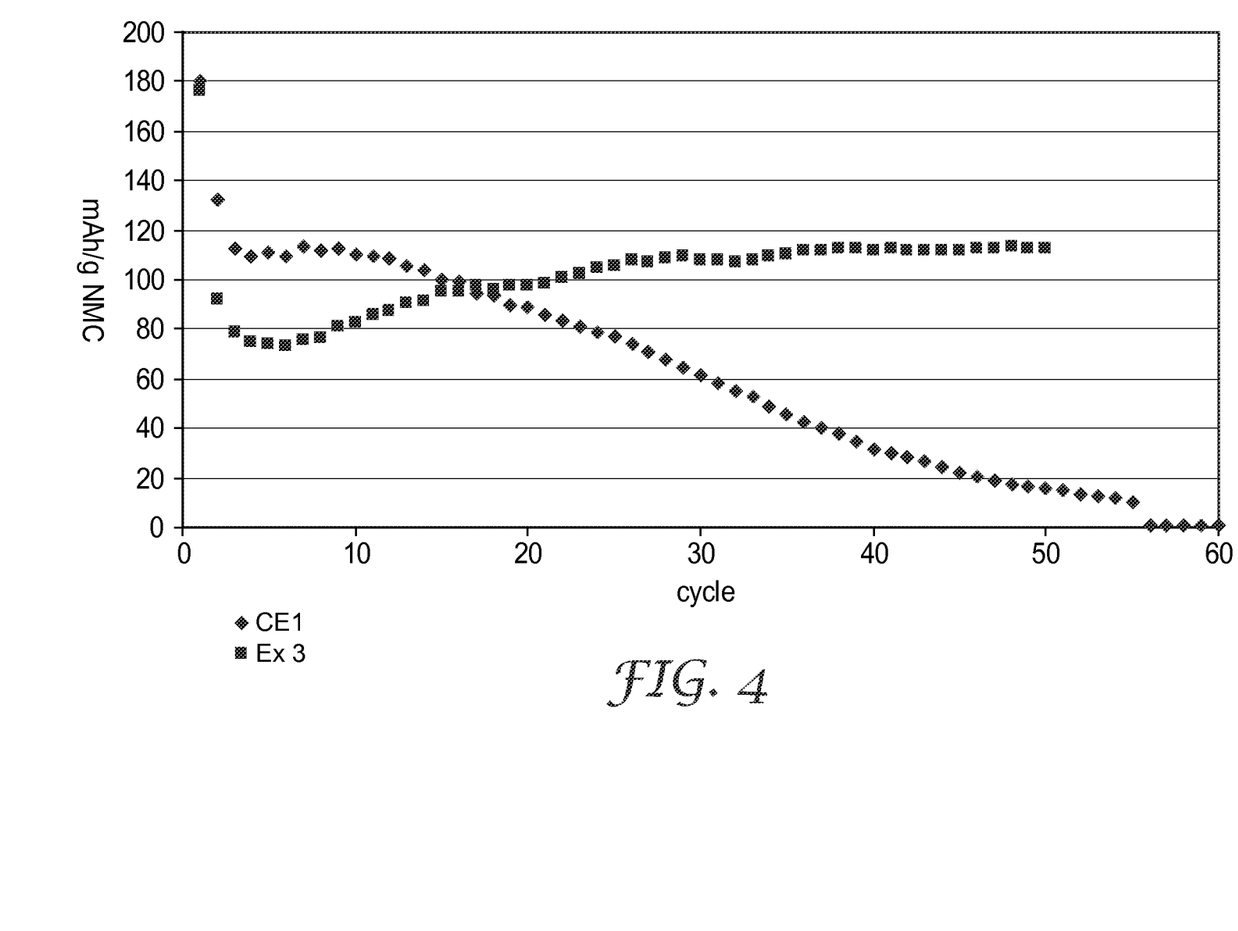
FIG. 4 is a graph of the specific capacity (mAh/g) of the positive electrode vs. cycle of a 2325 coin cell containing an $Al_{99}Ga_1$ negative electrode and that of a comparative negative electrode.

$Al_{99}Ga_1$ Foil Electrode 24.35 g of 99.99% pure aluminum shot was melted in a ceramic crucible at 750° C. After 31 minutes at 750° C., 0.582 g of 99.99% pure gallium metal was added to the crucible. Heating at 750° C. was continued for an additional 5 minutes and then the molten metal mixture was poured into a copper mold and allowed to cool to room temperature. As in Example 1, a 50 µm and 100 µm thick foil of $Al_{99}Ga_1$ was rolled from the melt and used as a negative electrode in an electrochemical cell construction. FIG. 4 shows the cycle life of a 2325 coin cell using $Al_{99}Ga_1$ foil as the negative electrode and the positive electrode of Example 1. The cycle life of a cell using 99.99% pure aluminum as the negative electrode and NMC as the positive electrode is also shown as a comparative example (CE1).

Example 4

Figure 5:
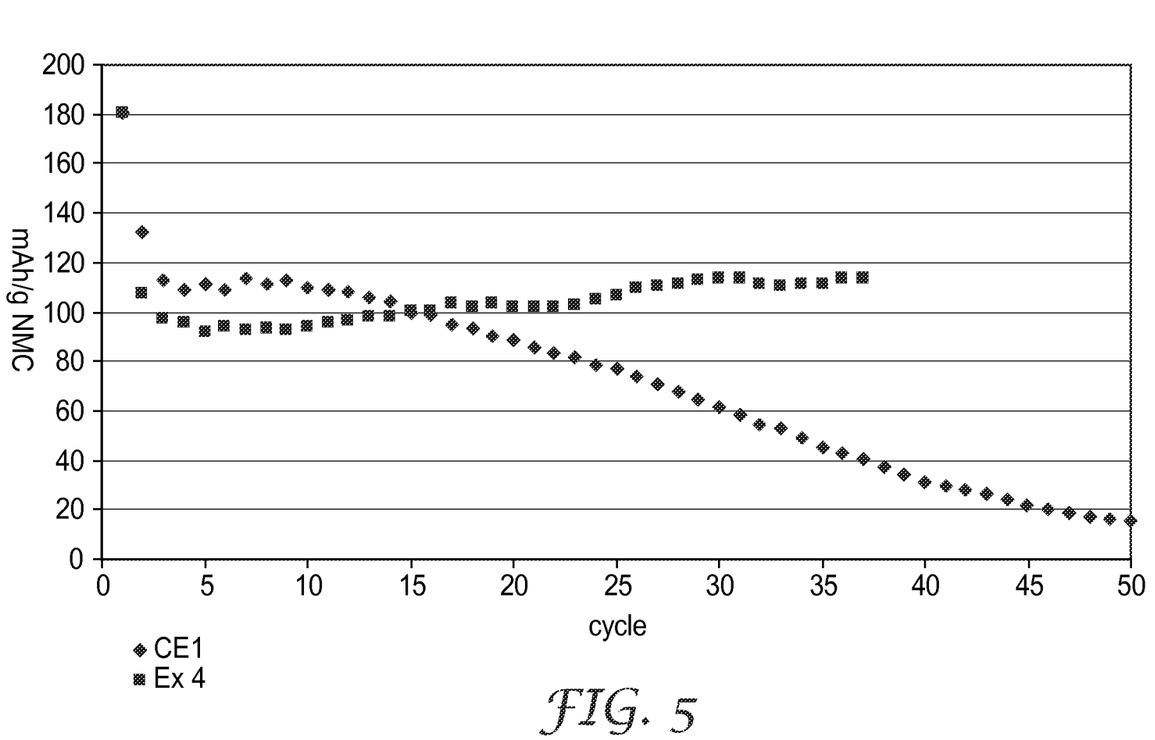
FIG. 5 is a graph of the specific capacity (mAh/g) of the positive electrode vs. cycle of a 2325 coin cell containing an $Al_{98}Si_1In_1$ negative electrode and that of a comparative negative electrode.

$Al_{98}Si_1In_1$ Foil Electrode 21.94 g of 99.99% pure aluminum shot was melted at 750° C. in air for 27 minutes. After 27 minutes 0.246 g 99.99% pure silicon and 0.944 g indium were added to the crucible containing the molten aluminum. Heating was continued for an additional 14 minutes and then the melt was poured into a copper mold and allowed to cool to room temperature to form an ingot. From this ingot a thin film approximately 50 µm thick was rolled and used as a negative electrode in a battery construction identical to that described in Example 1. FIG. 5 shows the cycle life performance of this negative electrode compared to a 99.99% pure aluminum electrode as a comparative example (CE1).

Example 5

Figure 6:
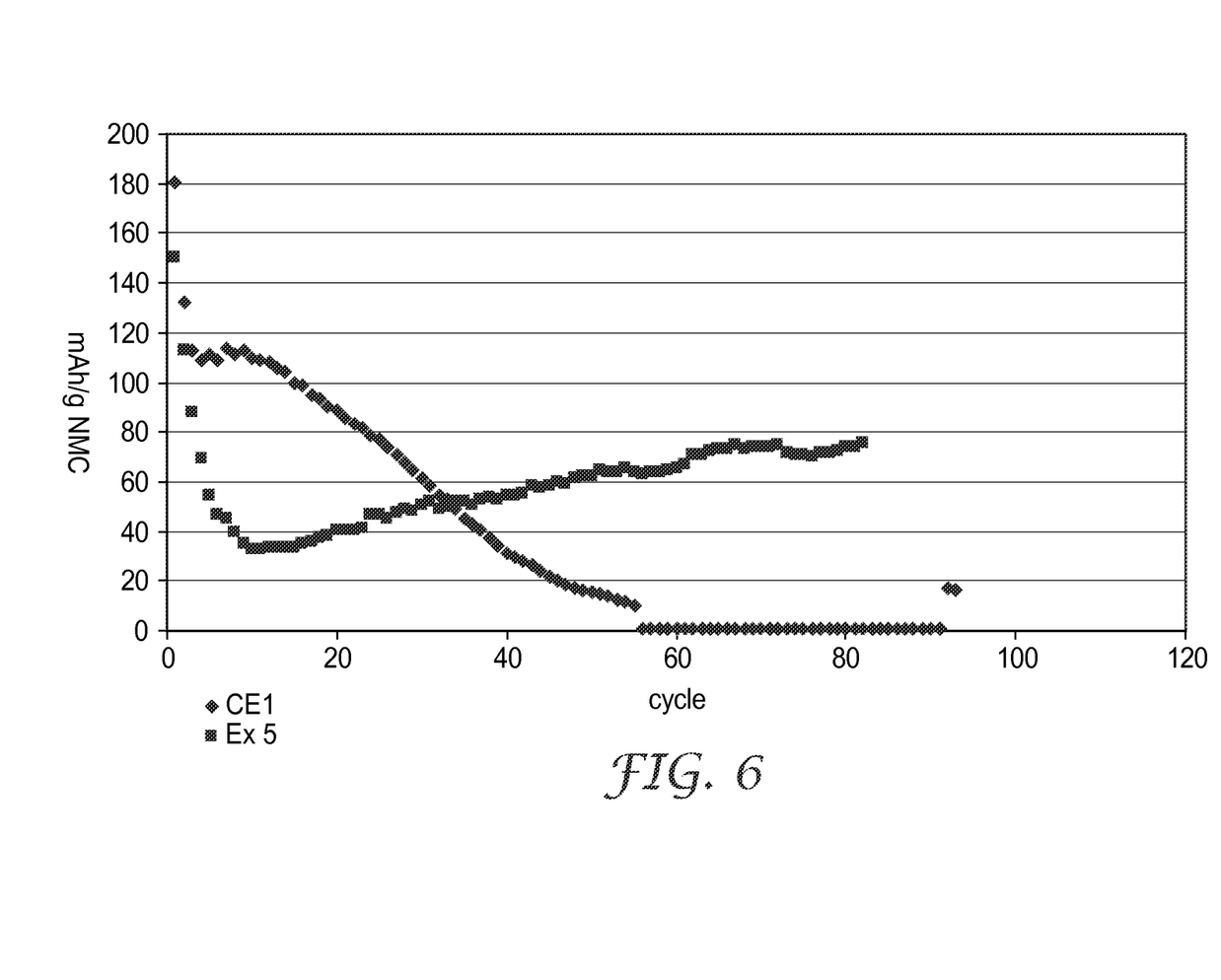
FIG. 6 is a graph of the specific capacity (mAh/g) of the positive electrode vs. cycle of a 2325 coin cell containing an $Al_{98}Sn_1In_1$ negative electrode and that of a comparative negative electrode.

$Al_{98}Sn_1In_1$ Foil Electrode 21.123 g of 99.99% pure aluminum shot was melted at 750° C. for 22 minutes. Then 0.912 g of 99.99% tin and 0.932 g of 99.99% pure indium was added. Heating at 750° C. continued for an additional 13 minutes and then the melt was quenched in a copper mold. Thin foil approximately 75 µm thick was rolled from the ingot and used as a negative electrode in a 2325 coin cell construction and the positive electrode as in Example 1. FIG. 6 shows the cycle life comparison relative a cell constructed with the same positive electrode as in Example 1 and pure aluminum as a negative electrode.

Example 6

Figure 7:
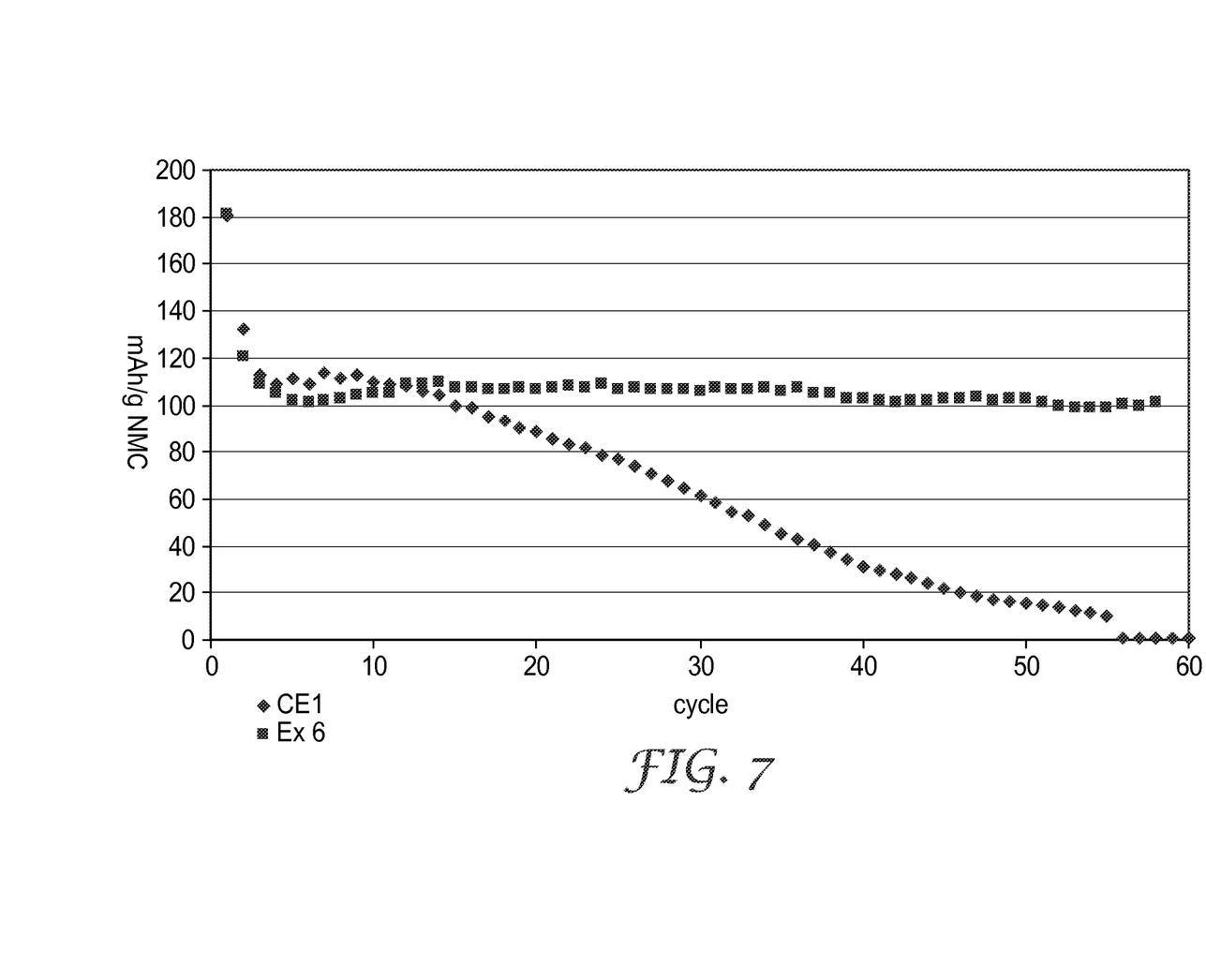
FIG. 7 is a graph of the specific capacity (mAh/g) of the positive electrode vs. cycle of a 2325 coin cell containing an $Al_{98}Si_1Sn_1$ negative electrode and that of a comparative negative electrode.

$Al_{98}Si_1Sn_1$ Foil Electrode 25.868 g of 99.99% pure aluminum was melted at 750° C. in air. After 21 minutes 1.170 g of 99.99% pure tin and 0.274 g of 99.99% silicon were added to the crucible containing the molten aluminum. After an additional 21 minutes at 750° C. the contents of the crucible were poured into a copper mold and allowed to cool to room temperature. After rolling a piece of the ingot into a foil, a battery containing the foil of $Al_{98}Si_1Sn_1$ as the negative electrode and the positive electrode used in Example 1 was assembled. FIG. 7 shows the cycle life performance.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A thin film electrode comprising:
   a thin foil comprising polycrystalline aluminum and at least one additional electrochemically active component,
   wherein the additional electrochemically active component is in the form of precipitates, grain boundaries, or a combination thereof, within the polycrystalline aluminum, and wherein the foil has a thickness in the range of about 50 µm to less than about 500 µm.

2. A thin film electrode according to claim 1, wherein the at least one additional electrochemically active component is selected from indium, silicon, tin, gallium, and a combination thereof.

3. A thin film electrode according to claim 2, wherein the at least one additional electrochemically active component is selected from indium and silicon.

4. A thin film electrode according to claim 3, wherein the at least one additional electrochemically active component is indium.

5. A thin film electrode according to claim 1, comprising at least two additional electrochemically active components.

6. A thin film electrode according to claim 1, wherein the electrochemically active component or components are present in the foil in 20 mole percent or less.

7. A thin film electrode according to claim 6, wherein the electrochemically active component or components are present in the foil in 5 mole percent or less.

8. A thin film electrode according to claim 1, wherein the foil has a thickness in the range of about 50 µm to less than about 100 µm.

9. A lithium-ion electrochemical cell comprising:
   a positive electrode; and
   a negative electrode,
   wherein the negative electrode comprises:
      a thin foil comprising polycrystalline aluminum and at least one additional electrochemically active component, wherein the additional electrochemically active component is in the form of precipitates, grain boundaries, or a combination thereof, within the polycrystalline aluminum, and wherein the foil has a thickness of less than about 500 µm.

10. A lithium-ion electrochemical cell according to claim 9, wherein the positive electrode comprises a lithium mixed metal oxide.

11. A lithium-ion electrochemical cell according to claim 10, wherein the mixed metal oxide comprises manganese, nickel, and cobalt.

12. A lithium-ion electrochemical cell according to claim 11, wherein the cell maintains a specific capacity of the positive electrode of greater than about 100 mAh/g over at least 50 charge/discharge cycles.

13. A lithium-ion electrochemical cell according to claim 11, wherein the cell maintains a specific capacity of the positive electrode of greater than about 75 mAh/g over at least 50 charge/discharge cycles.

14. A lithium-ion electrochemical cell comprising:
a positive electrode; and
a negative electrode,
wherein the negative electrode consists essentially of:
a thin foil comprising polycrystalline aluminum and at least one additional electrochemically active component,
wherein the additional electrochemically active component is in the form of precipitates, grain boundaries, or a combination thereof, within the polycrystalline aluminum, and
wherein the foil has a thickness of less than about 500 µm.

15. A lithium-ion electrochemical cell according to claim 14, wherein the positive electrode comprises a lithium mixed metal oxide.

16. A lithium-ion electrochemical cell according to claim 15, wherein the mixed metal oxide comprises manganese, nickel, and cobalt.

17. A lithium-ion electrochemical cell according to claim 14, wherein the cell maintains a specific capacity of the positive electrode of greater than 100 mAh/g over at least 50 charge/discharge cycles.

18. A lithium-ion electrochemical cell according to claim 14, wherein the cell maintains a specific capacity of the positive electrode of greater than about 75 mAh/g over at least 50 charge/discharge cycles.

* * * * *

UNITED STATES PATENT AND TRADEMARK OFFICE
CERTIFICATE OF CORRECTION

PATENT NO. : 8,420,261 B2
APPLICATION NO. : 12/795740
DATED : April 16, 2013
INVENTOR(S) : Krause et al.

Page 1 of 1

It is certified that error appears in the above-identified patent and that said Letters Patent is hereby corrected as shown below:

<u>On Drawing Sheet 3 of 7 of the Drawings under FIG. 3</u>
Delete "Ceulombic" and insert -- Coulombic --, therefor.

Signed and Sealed this
Third Day of September, 2013

Teresa Stanek Rea
*Acting Director of the United States Patent and Trademark Office*